(12) United States Patent
Baumann

(10) Patent No.: US 10,571,347 B2
(45) Date of Patent: Feb. 25, 2020

(54) PRESSURE SENSOR COMPRISING A SENSOR ELEMENT ARRANGED BETWEEN TWO LONGITUDINAL GROOVES

(71) Applicant: Micronas GmbH, Freiburg (DE)

(72) Inventor: Marc Baumann, Freiburg (DE)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 15/078,284

(22) Filed: Mar. 23, 2016

(65) Prior Publication Data
US 2016/0282206 A1 Sep. 29, 2016

(30) Foreign Application Priority Data

Mar. 24, 2015 (DE) .......................... 10 2015 104 410

(51) Int. Cl.
*G01L 1/18* (2006.01)

(52) U.S. Cl.
CPC ....................... *G01L 1/18* (2013.01)

(58) Field of Classification Search
CPC .................... G01L 1/18; G01L 9/009
See application file for complete search history.

(56) References Cited

U.S. PATENT DOCUMENTS

| | | | |
|---|---|---|---|
| 4,695,963 A * | 9/1987 | Sagisawa | B25J 13/081 414/5 |
| 5,092,645 A * | 3/1992 | Okada | B25J 13/085 294/119.1 |
| 5,095,762 A | 3/1992 | Holm-Kennedy et al. | |
| 5,222,398 A * | 6/1993 | O'Brien | G01L 1/2243 177/211 |
| 5,341,688 A * | 8/1994 | Morikawa | G01L 1/18 73/777 |
| 5,349,873 A * | 9/1994 | Omura | G01L 1/18 73/720 |
| 5,394,751 A * | 3/1995 | Ishibashi | G01L 19/0084 257/676 |
| 5,526,700 A * | 6/1996 | Akeel | G01L 1/18 73/862.042 |
| 5,539,236 A * | 7/1996 | Kurtz | G01P 15/123 257/415 |
| 5,600,074 A | 2/1997 | Marek et al. | |

(Continued)

FOREIGN PATENT DOCUMENTS

| | | |
|---|---|---|
| CN | 101691851 | 4/2010 |
| CN | 103278269 | 9/2013 |

(Continued)

*Primary Examiner* — Lisa M Caputo
*Assistant Examiner* — Tran M. Tran
(74) *Attorney, Agent, or Firm* — 24IP Law Group USA, PLLC; Timothy Dewitt

(57) ABSTRACT

A pressure sensor (10) has a carrier chip (20) in and/or on which at least one sensor element (30) is integrated, the measuring signal of which depends on the mechanical stress in the carrier chip (20). The carrier chip (20) is connected on its back side in a flat and material-locking fashion to a solid body (50), the modulus of elasticity of which differs from the modulus of elasticity of the carrier chip (20). The carrier chip (20) has at least two independent and longitudinal grooves (80a, 80b) between which the sensor element (30a, 30b) is arranged. The pressure sensor has a bias voltage circuit (40) and is used in a common rail injection system.

14 Claims, 10 Drawing Sheets

(56) References Cited

U.S. PATENT DOCUMENTS

| | | | | |
|---|---|---|---|---|
| 5,637,801 A * | 6/1997 | Ichihashi | G01L 19/147 | 73/715 |
| 5,932,332 A * | 8/1999 | Pandorf | G01L 9/0072 | 428/220 |
| 5,998,234 A * | 12/1999 | Murata | H01L 21/78 | 257/E21.599 |
| 6,779,406 B1 * | 8/2004 | Kuznia | G01L 19/0007 | 73/706 |
| 6,938,490 B2 * | 9/2005 | Wagner | G01L 9/0042 | 73/708 |
| 6,951,142 B2 * | 10/2005 | Ohsato | G01L 5/162 | 73/862.041 |
| 7,159,466 B2 * | 1/2007 | Hasegawa | G01L 9/0055 | 73/721 |
| 7,228,745 B2 * | 6/2007 | Kunda | G01L 9/0055 | 73/754 |
| 7,270,009 B2 * | 9/2007 | Miyashita | G01L 19/04 | 73/715 |
| 7,290,453 B2 | 11/2007 | Brosh | | |
| 7,392,716 B2 * | 7/2008 | Wilner | G01L 1/2231 | 73/754 |
| 7,404,330 B2 * | 7/2008 | Uchigashima | G01L 9/0042 | 73/715 |
| 7,530,274 B2 * | 5/2009 | Kurtz | G01M 3/3236 | 73/714 |
| 7,559,247 B2 * | 7/2009 | Otsuka | G01L 9/0055 | 73/715 |
| 7,584,666 B2 * | 9/2009 | Kim | A61B 5/021 | 128/897 |
| 7,631,559 B2 * | 12/2009 | Mochida | G01P 15/0802 | 73/509 |
| 7,685,881 B2 * | 3/2010 | Reijs | B81B 3/0072 | 73/715 |
| 8,017,435 B2 * | 9/2011 | Leib | B81C 1/0023 | 257/678 |
| 8,091,431 B2 * | 1/2012 | Motoyama | G01L 9/0022 | 73/717 |
| 8,113,065 B2 * | 2/2012 | Ohsato | G01L 1/18 | 29/592.1 |
| 8,171,806 B2 * | 5/2012 | Mizuno | G01L 9/0098 | 73/777 |
| 8,399,293 B2 * | 3/2013 | Leib | B81C 1/0023 | 257/E21.613 |
| 8,438,931 B2 * | 5/2013 | Kazama | G01B 7/16 | 73/777 |
| 8,519,449 B2 * | 8/2013 | Dumitru | B82Y 10/00 | 257/254 |
| 8,627,559 B2 * | 1/2014 | Suminto | G01L 9/0042 | 257/659 |
| 8,833,172 B2 * | 9/2014 | Chiou | G01L 9/0052 | 73/700 |
| 8,857,258 B2 * | 10/2014 | Ohkoshi | G01C 19/574 | 73/504.12 |
| 8,878,313 B2 * | 11/2014 | Salmaso | G01L 9/0042 | 257/415 |
| 8,881,596 B2 * | 11/2014 | Chiou | G01L 19/04 | 361/283.4 |
| 8,915,152 B2 * | 12/2014 | Baumann | G01L 1/18 | 73/862.625 |
| 8,931,347 B2 * | 1/2015 | Donzier | G01L 9/0042 | 73/706 |
| 9,310,265 B2 * | 4/2016 | Shimoyama | G01L 1/04 | |
| 9,581,427 B2 * | 2/2017 | Ashida | G01B 7/18 | |
| 9,581,511 B2 * | 2/2017 | Kwa | G01L 9/0052 | |
| 9,581,614 B2 * | 2/2017 | Kwa | B81B 3/0021 | |
| 9,645,032 B2 * | 5/2017 | Shimoyama | G01L 9/0001 | |
| 9,719,868 B2 * | 8/2017 | Sarakoglou | G01L 1/2206 | |
| 9,759,620 B2 * | 9/2017 | Monichino | G01L 19/148 | |
| 9,891,124 B2 * | 2/2018 | Suzuki | G01L 9/0044 | |
| 10,006,825 B2 * | 6/2018 | Brida | G01L 19/04 | |
| 10,060,815 B2 * | 8/2018 | Kazama | G01L 9/0044 | |
| 2002/0029639 A1 * | 3/2002 | Wagner | G01L 9/0042 | 73/756 |
| 2004/0232507 A1 * | 11/2004 | Furukubo | B81B 7/0048 | 257/433 |
| 2007/0295095 A1 | 12/2007 | Kurtz et al. | | |
| 2011/0309415 A1 * | 12/2011 | Ng | G01L 1/005 | 257/254 |
| 2012/0003791 A1 | 1/2012 | Leib et al. | | |
| 2013/0192378 A1 | 8/2013 | Chiou et al. | | |
| 2016/0282206 A1 * | 9/2016 | Baumann | G01L 1/18 | |

FOREIGN PATENT DOCUMENTS

| | | |
|---|---|---|
| DE | 41 37 624 | 5/1993 |
| DE | 199 63 786 A1 | 7/2001 |
| DE | 10 2006 032 925 A1 | 1/2008 |
| DE | 10 2013 200 106 A | 8/2013 |
| EP | 0 548 907 B1 | 4/1996 |
| EP | 0 793 082 B1 | 9/1998 |
| WO | 2009/028283 A1 | 3/2009 |

* cited by examiner

PRESSURE SENSOR COMPRISING A SENSOR ELEMENT ARRANGED BETWEEN TWO LONGITUDINAL GROOVES

CROSS-REFERENCE TO RELATED APPLICATIONS

This invention claims priority to and benefit of German patent application No. 10 2015 104 410.2 "Drucksensor" filed on 24 Mar. 2015, the disclosure of which is incorporated in its entirety by reference.

BACKGROUND OF THE INVENTION

Field of the Invention

The invention relates to a pressure sensor with a solid body and a carrier chip connected to the solid body, and at least one sensor element.

Brief Description of the Related Art

Pressure sensors are known, for example, from the German patent application No. DE 199 63 786 A1. The pressure sensor disclosed in this document has a rectangular semiconductor chip connected over its back side to a cuboid solid body made of borosilicate glass by means of an anodic bond connection. The material of the semi-conductor chip and the borosilicate glass have a different modulus of elasticity.

From the dissertation "Robust Piezoresistive CMOS Sensor Microsystems", Marc Baumann, April 2013, Der Andere Verlag, ISBN 978-3-86247-354-0, such pressure sensors are further known.

The German patent document no. DE 41 37 624 further teaches a silicon chip for use in a power sensor. The chip has two grooves introduced on the upper side with two piezoresistive elements arranged between the grooves.

Other pressure sensors are known, for example, from the German patent document no. DE 199 63 786, the U.S. Patent Application Publication No. 2006/0144153, the U.S. Pat. No. 5,095,762, the international patent application no. WO 2009/028283 A1, the European patent no. EP 0 548 907 B1, the European patent no. EP 0 793 082 B1, the U.S. Pat. No. 7,290,453 and the German patent application No. DE 10 2013 200 106 A1.

SUMMARY OF THE INVENTION

A pressure sensor for use, for example, in a common rail injection system for a motor vehicle is described in this document. The pressure sensor comprises a solid body and a carrier chip connected to the solid body. At least two grooves are present in the surface of the carrier chip and a sensor element is arranged between the two grooves. The two grooves are independent from another are constructed in a longitudinal manner. The sensor element has at least one bias voltage circuit connected to one or several sensor elements. Upon applying overpressure or a vacuum to the pressure sensor, the mechanical stress is concentrated within the carrier chip by the longitudinal grooves. The pressure sensor is as a result more sensitive. The bias voltage circuit also permits an adjustment of the supply voltage of the sensor elements, for example in order to compensate for temperature variations in the pressure sensor.

In an aspect of the pressure sensor, the two sensor elements are arranged parallel to each other. The two or more of the sensor elements can be arranged in a further aspect between the two longitudinal grooves in order to provide redundancy. Moreover, more than one pair of longitudinal grooves can be provided in the surface of the carrier chip.

The sensor element is formed, for example, by a Wheatstone bridge, wherein the arms of the Wheatstone bridge are formed either by resistors or by field effect transistors. The use of the field effect transistors reduces the temperature sensitivity of the sensor element.

The carrier chip has a modulus of elasticity that differs from the modulus of elasticity of the solid body. Due to these different moduli of elasticity, the mechanical stresses occur in the carrier chip. These mechanical stresses cause a change of the electrical resistance of the piezoresistive resistors or of the field effect transistors in the surface of the carrier chip, and as a result provide the results of the measurement of the pressure.

The smaller the thickness of the carrier chip, the more sensitive are the carrier chips and as a result the pressure sensor formed of a thinner carrier chip. A carrier chip has in one aspect a thickness of less than 100 µm and in another aspect of less than 50 µm.

The pressure sensors can be used, for example, in a fuel injection system and are subject in the fuel injection system to large variations in temperature. For this reason, the supply voltage of the sensor elements is controllable using a bias voltage circuit to reduce the variability of the measurements due to temperature effects. This temperature-dependent bias voltage is controlled either with the aid of a thermistor, an electrical circuit or other control means. In one aspect of the invention, the gate voltage can be applied to one or several of the field effect transistors individually and can as a result be controlled individually. Alternatively, an additional source can be used for the temperature-dependent supply voltage, which controls the supply voltage for all elements in the Wheatstone bridge.

In a further embodiment the sensor does not have any longitudinal grooves and the sensor elements are attached on the chip largely symmetrically around the center.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE INVENTION

Figure 1:
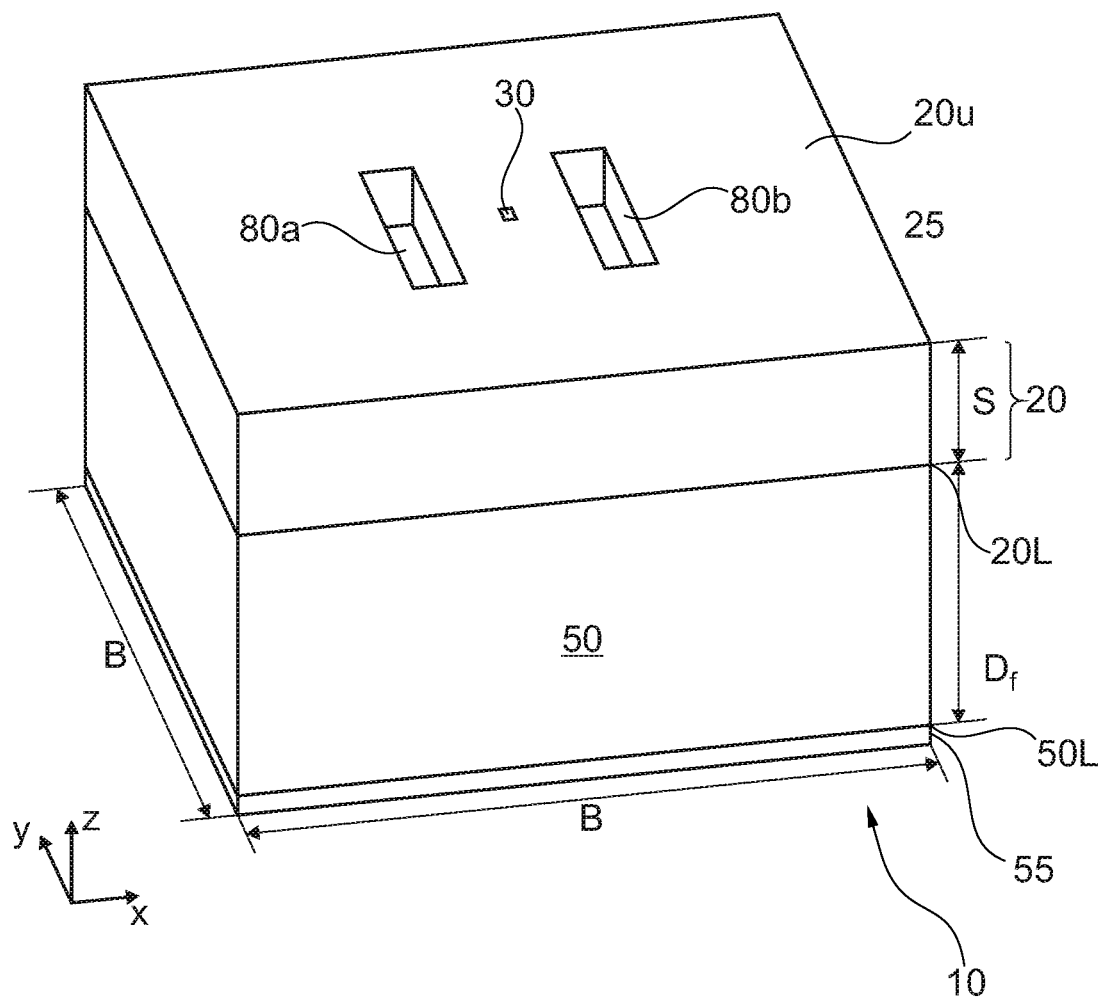
FIG. 1 is a first exemplary embodiment of a pressure sensor having a CMOS semiconductor chip with piezoresistive resistors integrated therein.

A pressure sensor uniformly designated by 10 in FIGS. 1 to 4 for measuring a hydrostatic pressure acting on the pressure sensor 10 has a carrier chip 20 configured as a semiconductor chip with a monocrystalline silicon substrate. At least one sensor element 30 is integrated in the carrier chip 20. The output signal of the at least one sensor element 30 depends on the mechanical stress on or in the front side surface 20u of the carrier chip 20 and is thus dependent on the pressure exerted on the at least one sensor element 30.

The sensor element 30 integrated in the carrier chip 20 is understood to mean a sensor element 30 which is embedded in the surface 20u of the carrier chip 20 and/or applied on top of the surface 20u. The sensor element 30 can comprise a metallic strain gauge strip, a piezoresistive resistor and/or a piezoresistive field-effect transistor.

The carrier chip 20 has in this non-limiting aspect a substantially square base surface. The side length of the substantially square base surface is designated by the letter B in FIGS. 1, 2A and 2B. The silicon substrate of the carrier chip 20 has a first outer edge area or a first edge extending in the direction of a x-axis of the carrier chip plane of the carrier chip 20. The term "carrier chip plane" is understood in this context to mean the plane in the main (top) surface of the carrier chip 20. This carrier chip plane extends parallel to the drawing plane in FIGS. 2A and 2B.

Figure 2A:
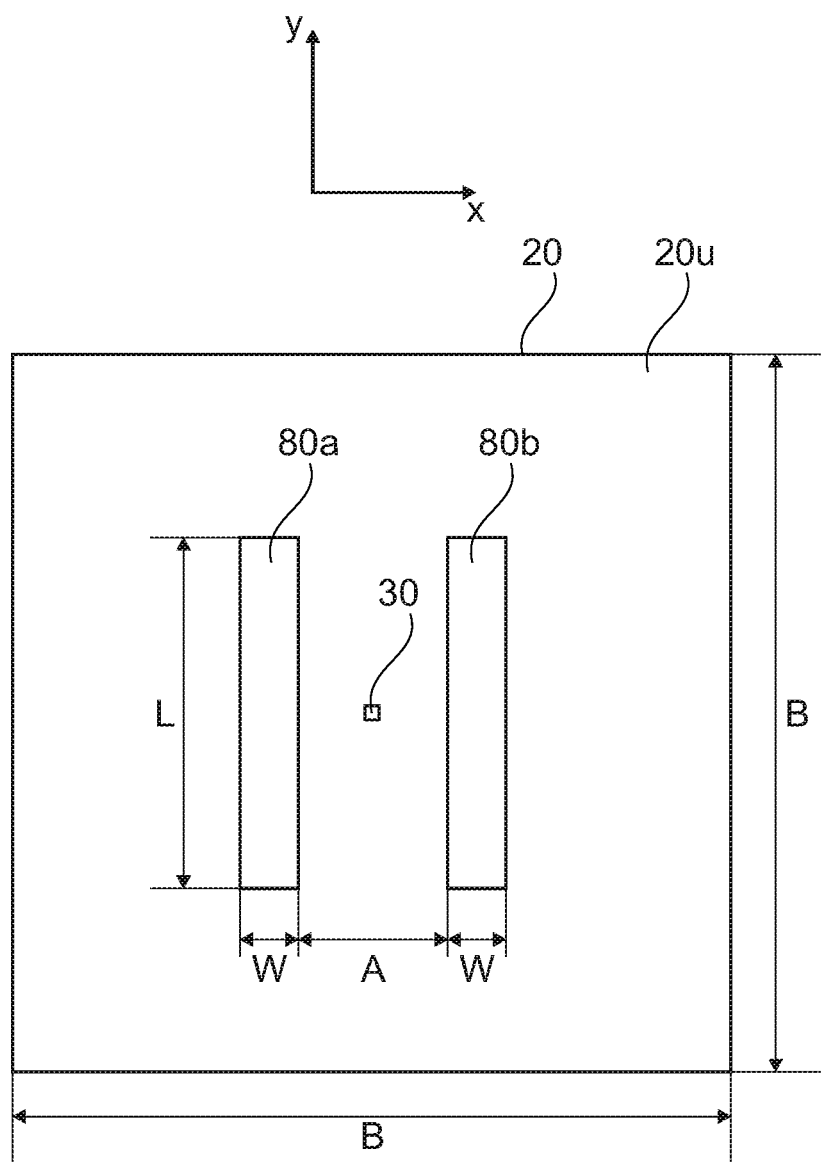
FIG. 2A, 2B shows a top view of the semiconductor chip of the pressure sensor shown in FIG. 1 with two longitudinal grooves present in the surface of the carrier chip can be seen.
Figure 2B:
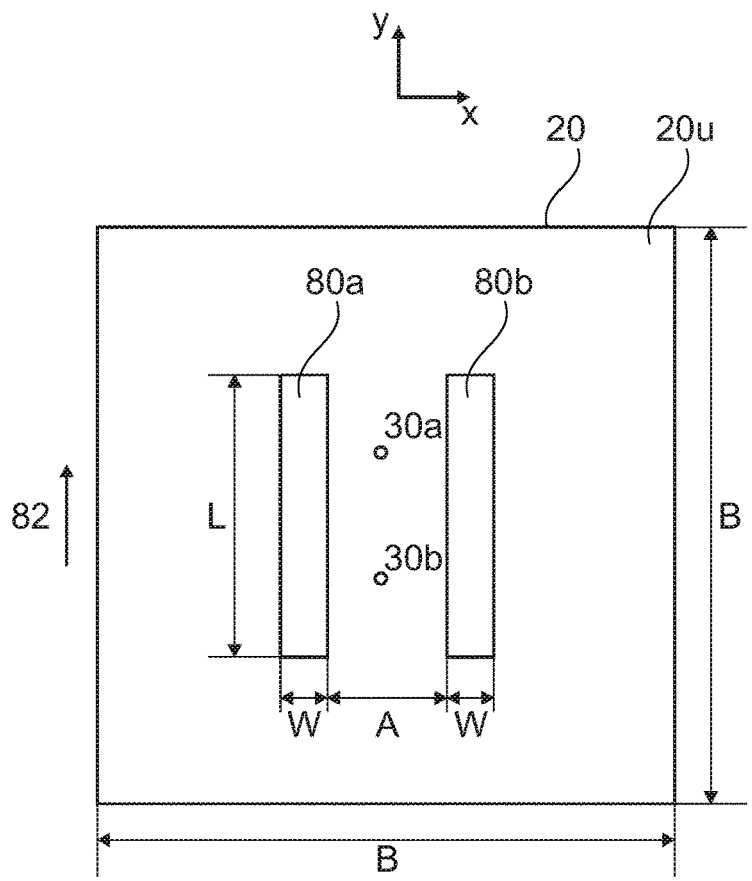
Figure 3:
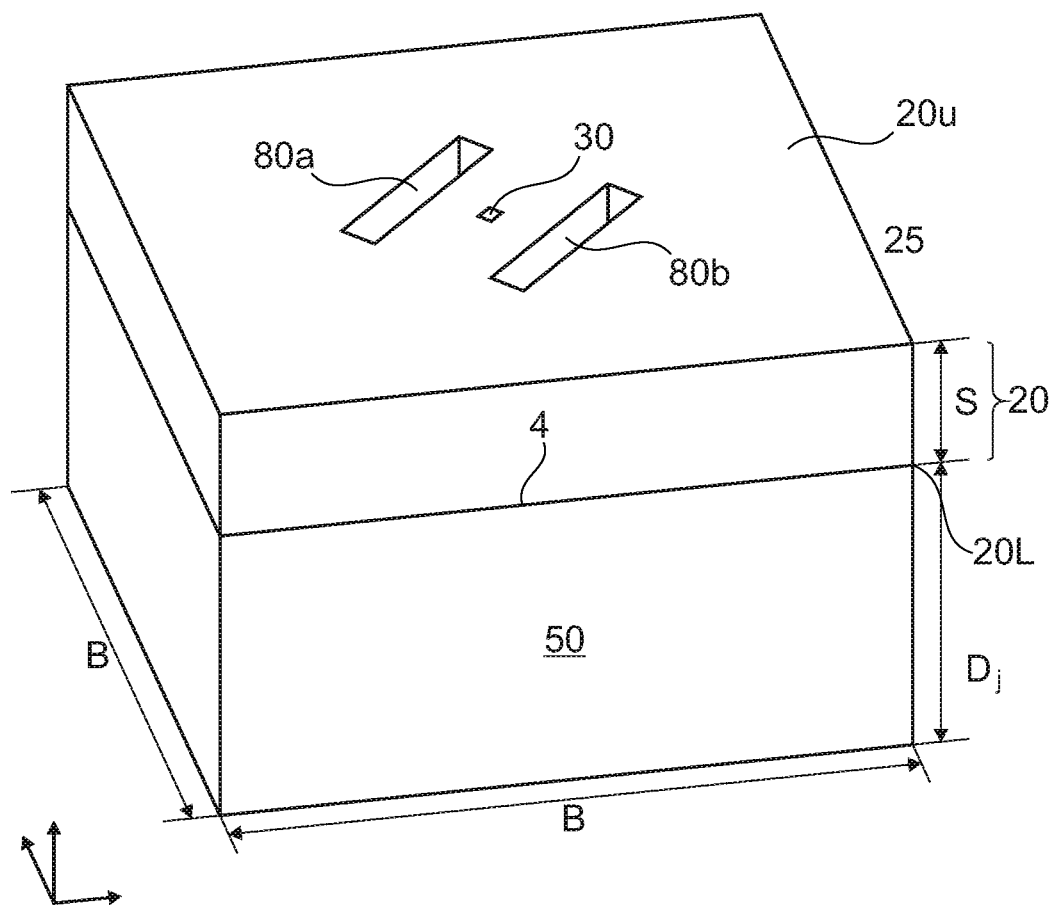
FIG. 3 shows a second exemplary embodiment of the pressure sensor, in which the longitudinal grooves are rotated by 45° in the carrier chip plane in comparison to the first exemplary embodiment.

In FIGS. 1, 2A and 3 only one single sensor element 30 is shown. FIG. 2B shows an aspect with two sensor elements 30a and 30b. The invention is not limited to a particular number of sensor elements 30, 30a, 30b.

A second outer edge area or a second edge of the carrier chip 2 is oriented in the direction of a y-axis of the carrier chip plane. In FIGS. 2A and 2B it can be seen that the y-axis is arranged in the carrier chip plane orthogonally to the x-axis. The x-axis and the y-axis thus form a Cartesian coordinate system.

Figure 6A:
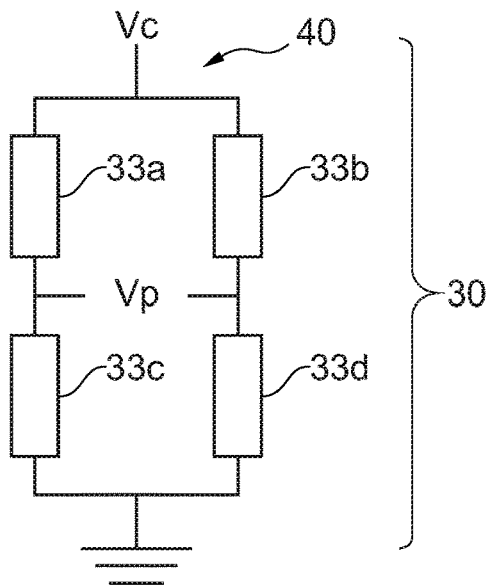
FIG. 6A-6H show in each case one Wheatstone bridge with bias voltage circuit with various arrangements of the Wheatstone bridge with bias voltage circuit.
Figure 6B:
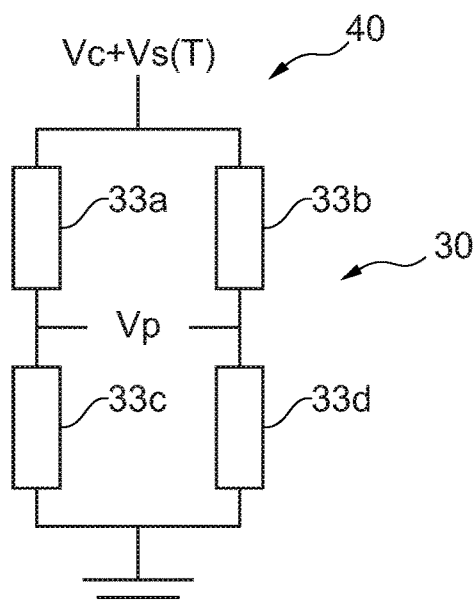
Figure 6C:
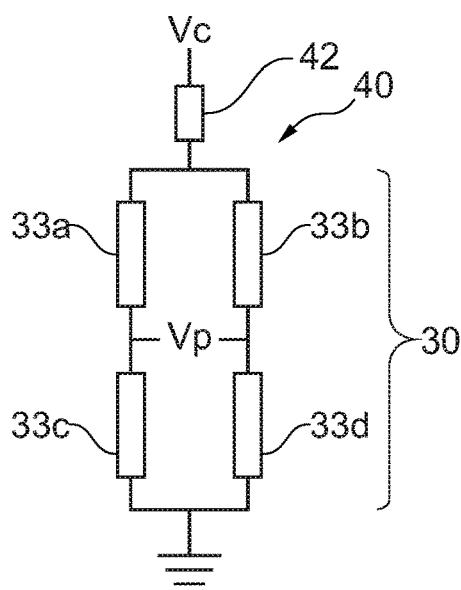

The sensor element 30 of FIG. 1 has four piezoresistive resistors integrated in the surface 20u of the silicon substrate, which are shown in detail in FIGS. 6A-6C and are interconnected by conductor paths (not shown) to a Wheatstone bridge integrated in the carrier chip 20.

In the exemplary embodiment of FIG. 1, the piezoresistive resistors are configured as resistor paths arranged symmetrically about the center of the through-openings 80a and 80b and are spaced apart from the through-openings 80a, 80b and from the outer edge of the carrier chip 20. Each of the two conductor paths has two piezoresistive resistors arranged at an angle of 90° to one another.

The back side 50L of the solid body 50 facing away from the carrier chip 20 can be connected to a carrier plate 55. Electrical connection contacts are arranged on the carrier plate 55, which are connected to connectors of the sensor element 30 via bond wires (not shown). Two supply connectors of the sensor element 30 are connected to an electric voltage source via further conductor paths (not shown). A voltage source supplies a constant voltage of, for example, 5 Volts through the further conductor paths to the sensor element 30. Two measuring connectors of the sensor element 30 serve to capture a measuring voltage.

In a Wheatstone bridge, a first measuring signal connector is connected to a first supply connector, for example via a first piezoresistive resistor, and to a second supply connector via a second piezoresistive resistor. A second measuring signal connector is connected to the first supply connector via a third piezoresistive resistor, and to the second supply connector via a fourth piezoresistive resistor. FIGS. 6A-6C and 6F show different aspects of the Wheatstone bridge with the resistors and FIG. 6D-6E and 6H different aspects with the field effect transistors. These figures will be explained in more detail later on.

The carrier chip 20 is connected to the solid body 50 on its back side 20L via an anodic bonding connection. In an aspect of the pressure sensor 10, the material of the solid body 50 is chosen such that the material of the solid body 50 has approximately the same coefficient of thermal expansion as the material of the carrier chip 20. The mechanical stress in the carrier chip 20 is then largely independent of the temperature of the pressure sensor 10.

In a non-limiting configuration of the pressure sensor 10, the solid body 50 consists of borosilicate glass, the modulus of elasticity of which amounts to around 68 GPa and differs clearly from the direction-dependent modulus of elasticity of the silicon, which lies in the range of 130 to 168 GPa. The coefficient of thermal expansion of borosilicate glass corresponds approximately to the coefficient of thermal expansion of the silicon.

It would also be possible to use a different bond between the carrier chip 20 and the solid body 50 instead of the anodic bonding connection. It is also possible that the carrier chip 20 consists substantially of metal and the solid body 50 of a polymer material.

The solid body 50 can be arranged on the carrier plate 55 or on a suitable support, to which the solid body 50 is fixed, for example by means of an adhesive layer.

In FIGS. 1 and 3 it can be seen that the carrier chip 20 has approximately the same size of the base surface as the solid body 50 and is therefore disposed flush with the solid body 50. Different configurations also are conceivable, in which the carrier chip 20 and the solid body 50 have different sizes of the base surfaces. The pressure sensor 10 thus has a two-layer structure, in which one layer (here the solid body 50) consists of borosilicate glass and a second layer (here the carrier chip 20) consists substantially of silicon.

The carrier chip 20 has in one aspect two longitudinal grooves 80a and 80b extending parallel to each other in the direction of the y-axis in the exemplary embodiment shown in FIGS. 1, 2A and 2B. The longitudinal grooves 80a and 80b are configured as through openings or slits penetrating the carrier chip 20 in a direction that is normal to its carrier chip plane. The length L of the longitudinal grooves 80a and 80b, is in one aspect at least as large as the lateral distance A between the longitudinal grooves 80a and 80b. The width W of the longitudinal grooves 80a, 80b can be smaller than half the distance A and can in particular amount to a quarter of the distance A. However, the longitudinal grooves can also extend up to an outer edge 25 of the carrier chip 20, thereby further increasing the sensitivity of the pressure sensor.

The longitudinal grooves 80*a*, 80*b* are preferably spaced apart from the edges of the carrier chip 20. The carrier chip 20 has thereby a comparatively high mechanical strength after incorporation of the longitudinal grooves 80*a*, 80*b*. The longitudinal grooves 80*a*, 80*b* can have an extension deviating from a straight line, for example a curved extension. The longitudinal grooves 80*a*, 80*b* can also be curved in bow-shape manner and possibly extend along segments of a circular line.

The longitudinal grooves 80*a*, 80*b* in the embodiment of the pressure sensor 10 shown in FIGS. 1, 2A, 2B and 3 are incorporated in the surface 20*u* of the carrier chip 20 facing away from and lying opposite to the solid body 50. The longitudinal grooves 80*a*, 80*b* can be spaced apart from the back side 20*l* of the carrier chip 20. However, it is also possible that the longitudinal grooves 80*a*, 80*b* are configured as holes penetrating the carrier chip 20 transversally and possibly perpendicularly to its carrier chip plane. In this latter case, the deepest point of the longitudinal grooves 80*a*, 80*b* is on or in the solid body 50 at a distance to the back side of the solid body. The longitudinal grooves 80*a*, 80*b* can be incorporated in the carrier chip 20 during the production of the pressure sensor 10 by reactive ion etching as explained in FIG. 5A-5E. However, also different production methods are possible, such as for example laser ablation or milling.

In FIGS. 1 and 2A it can be seen that the sensor element 30 is arranged between the longitudinal grooves 80*a* and 80*b*. The center of area of the sensor element 30 in a top view of the carrier chip plane is disposed symmetrically between the longitudinal grooves 80*a* and 80*b*, for example approximately in the center of area of the surface area 20*u* of the carrier chip 20 disposed between the longitudinal grooves 80*a* and 80*b*.

In the exemplary embodiment shown in FIGS. 1 and 2A, the sensor element 30 is sensitive to the difference between the mechanical normal stress $\delta_x$ in a first plane arranged normally to the x-axis, and the mechanical normal stress $\delta_y$ in a second plane oriented normally to the y-axis.

Upon the action of a pressure change on the pressure sensor 10, due to the different moduli of elasticity of the carrier chip 20 and of the solid body 50, there occurs a change of the mechanical stress in the carrier chip 20. This mechanical stress is concentrated between the longitudinal grooves 80*a*, 80*b*. The mechanical stress causes a change of the electrical resistance values of the piezoresistive resistors 33*a-d* or of the field effect transistors 37*a-d*. This change of the electrical resistance values results in a change of the electrical voltage present between the measuring signal connectors of the sensor element 30.

Figure 4:
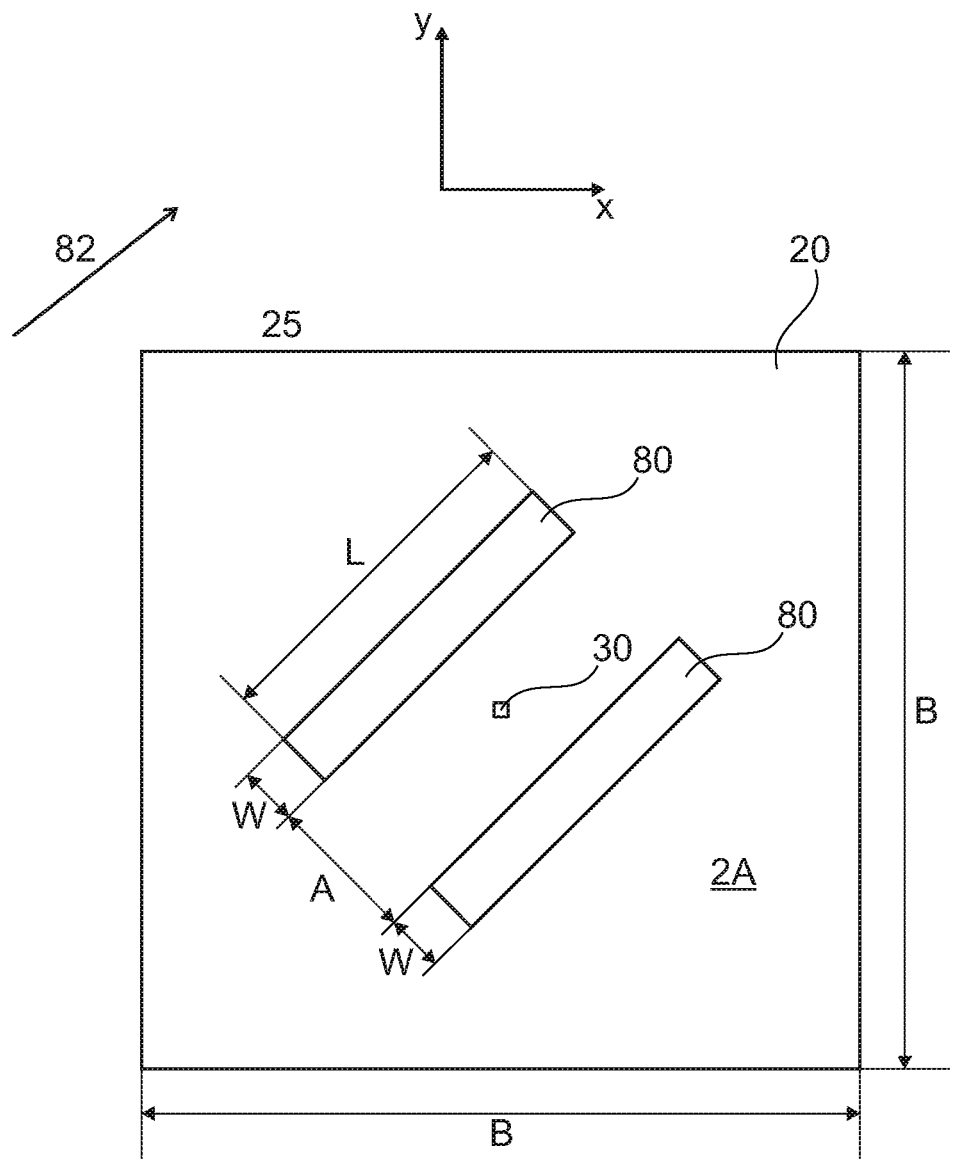
FIG. 4 shows a top view of the semiconductor chip of the pressure sensor shown in FIG. 3.

The pressure sensor 10 shown in FIGS. 3 and 4 differs from the pressure sensor shown in FIG. 1, 2A and 2B in that the main extension direction of the longitudinal grooves 80*a*, 80*b* in a top view of the carrier chip plane is arranged at an angle of 45° to the x-axis. It can be seen clearly that the x-axis and the y-axis in the carrier chip plane are each arranged at an angle of 45° to an outer edge area or an outer edge of the carrier chip 20. The dimensions and the spacing of the longitudinal grooves 80*a*, 80*b* are substantially the same as the corresponding measurements of the exemplary embodiments shown in FIGS. 1, 2A and 2B. Similar the outer dimensions of the carrier chip 20 and of the solid body 50 in the embodiments of FIGS. 3 and 4 are substantially the same as the corresponding measurements of the exemplary embodiments shown in FIGS. 1, 2A and 2B.

The sensor element 30 is also arranged between the longitudinal grooves 80*a* and 80*b* in the exemplary embodiment shown in FIGS. 3 and 4. The center of the sensor element 30 in a top view of the carrier chip plane is arranged approximately in the center of the surface area 20*u* of the carrier chip 20 between the longitudinal grooves 80*a* and 80*b*.

In the exemplary embodiment according to FIGS. 3 and 4 the sensor element 30 is sensitive or responsive to a shear stress with respect to the x-axis and the y-axis disposed in the carrier chip plane. The x-axis in the top view of the carrier chip plane is arranged at an angle of +45° and the y-axis is arranged at an angle of −45° to the main direction of extension of the longitudinal grooves 80*a*, 80*b*. This configuration of the pressure sensor 10 then permits a high measuring sensitivity for the shear stress occurring between the longitudinal grooves 80*a*, 80*b*.

In a pressure sensor 10, in which the carrier chip 20 has a silicon substrate with a direction-dependent modulus of elasticity between 130 and 168 GPa, and in which the solid body consists of borosilicate glass with an modulus of elasticity of 68 GPa, the square base surface has a side length B. The ration D/B of the thickness D of the solid body to the side length B should be larger than 0.5 and in one aspect is larger than 1.5. The measuring sensitivity of the pressure sensor 10 can be further enhanced by this value. The thickness D is understood to mean the dimension of the solid body 50 in a direction extending normally to the carrier chip plane.

In the illustrated, non-limiting exemplary embodiment, the carrier chip 20 has a layer thickness S of around 100 μm and a side length B of around 1 mm. This results in a normalized layer thickness of S/B=0.1. Generally, the normalized layer thickness S/B should be smaller than 0.1. The side length of the solid body 50 corresponds to that of the carrier chip 20. The thickness of the solid body 50 amounts to around 1 mm. This corresponds to a normalized layer thickness D/B=1.

FIG. 5A-5E show a method for the manufacture of the pressure sensor 10. First, a wafer 90 is provided. A plurality of the sensor elements 30 are integrated in the front side 80*a* of the wafer 90. These sensor elements 30 are produced in conventional CMOS technology in the wafer 90. The wafer 90 is polished on its back side 901 (FIG. 9A). A platelet 92 of borosilicate glass is provided.

Figure 5A:
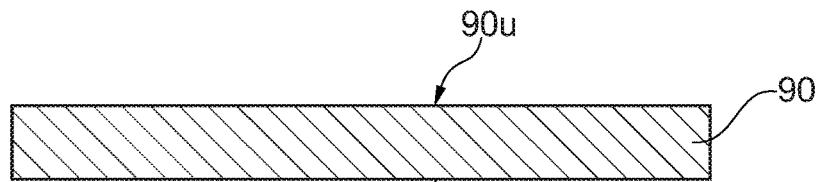
FIG. 5A-5E show method steps in the production of the pressure sensor.
Figure 5B:
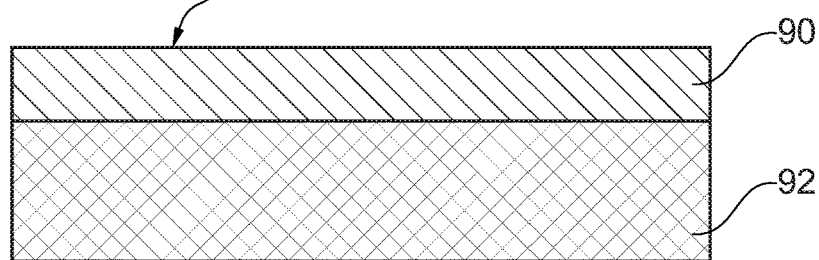
Figure 5C:
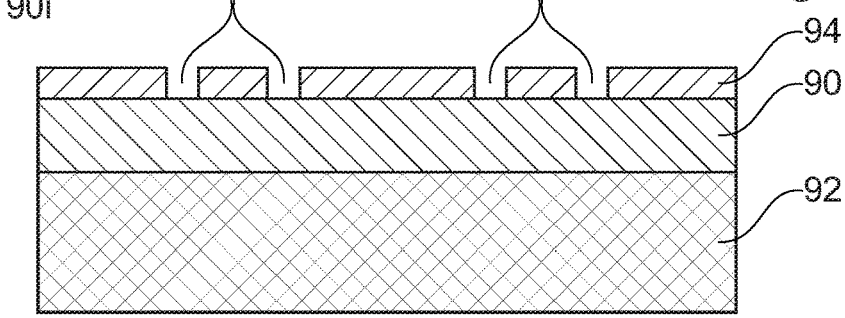
Figure 5D:
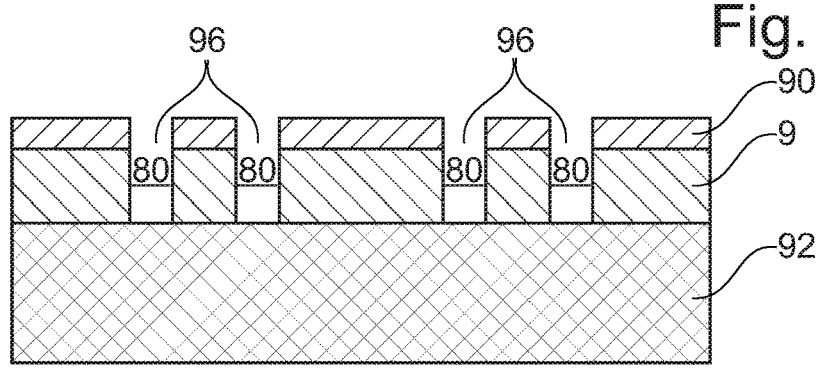

The back side of the wafer 90 is brought into contact over its surface with a surface area of the platelet 92 and is permanently connected to this platelet 92 by anodic bonding (FIG. 5B).

Then an etch mask 94 is photo-lithographically applied to the front side 90*u* of the wafer 90 facing away from the platelet 92. The etch mask 94 has holes 96 in the places where longitudinal grooves 80*a*, 80*b* are to be introduced in the wafer 90.

Subsequently, the wafer is brought into contact with an etching solution in the area of the holes 96. The etching solution removes material from the wafer 90 through a chemical or physical reaction in order to introduce the longitudinal grooves 80 in the wafer 90 (see FIG. 5D—the longitudinal grooves 80 in this figure have not been etched completely).

Figure 5E:
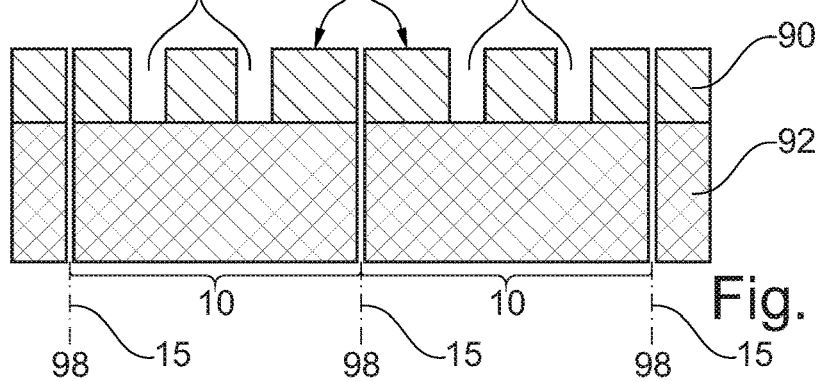

Then the etching solution and the etch mask 94 are removed and the pressure sensors 10 are detached from the thus obtained layer arrangement by dividing the same along predetermined separating lines 98 (FIG. 5E).

The pressure sensor 10 is suitable for high pressures in particular. It has a high resistance to overloading.

The mechanical stress is concentrated in the area between the longitudinal grooves 80*a*, 80*b* when applying an overpressure or vacuum to the pressure sensor 10. Therefore, the measuring sensitivity of the pressure sensor 10 is increased by arranging the sensor element 30 between the longitudinal grooves 80*a* and 80*b*.

FIGS. 6A-6H each show a usable Wheatstone bridge for the sensor element 30 with a bias voltage circuit 40. As mentioned above, the Wheatstone bridge is formed of four piezoresistive resistors 33*a*-*d* (FIGS. 6A-6C, 6G) or four field effect transistors 37*a*-37*d* (FIGS. 6D-6F, 6H). The Wheatstone bridge has a supply voltage Vc and the measuring voltage is captured over the center between the resistors 33*a* and 33*c* and 33*b* and 33*d* or of the field effect transistors 37*a* and 37*c* and 37*b* and 37*d*. For the sake of simplicity, the two conductor paths with the two piezoresistive resistors of the Wheatstone bridge are shown in each case arranged in a parallel manner in FIGS. 6A-6H. These conductor paths and the stress-sensitive resistors are arranged on the carrier chip in a usual manner for a Wheatstone measuring bridge at mutual offsets of 90°.

FIG. 6A shows an embodiment in which the supply voltage Vc is a constant voltage. In the exemplary embodiment of FIG. 6B a temperature-dependent voltage Vs is added to the supply voltage Vc. This temperature-dependent voltage Vs permits the compensation of the measuring results of the sensor element 30 through temperature variations in the pressure sensor 10. The temperature-dependent component of the voltage Vs (T) is generated by a voltage source, which is not shown on FIG. 6A.

In the exemplary embodiment of FIG. 6C a thermistor 42 is incorporated in the bias voltage circuit 40. This thermistor 42 ensures that the voltage Vc applied to the Wheatstone bridge is compensated to take into account temperature variations in the pressure sensor 10.

Figure 6D:
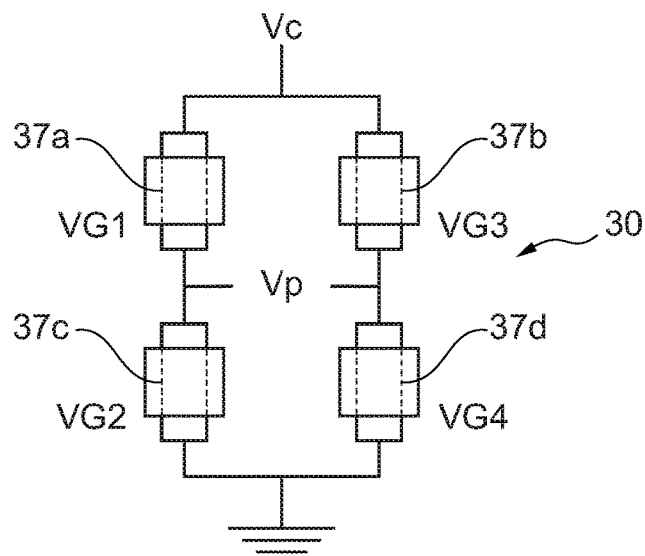
Figure 6E:
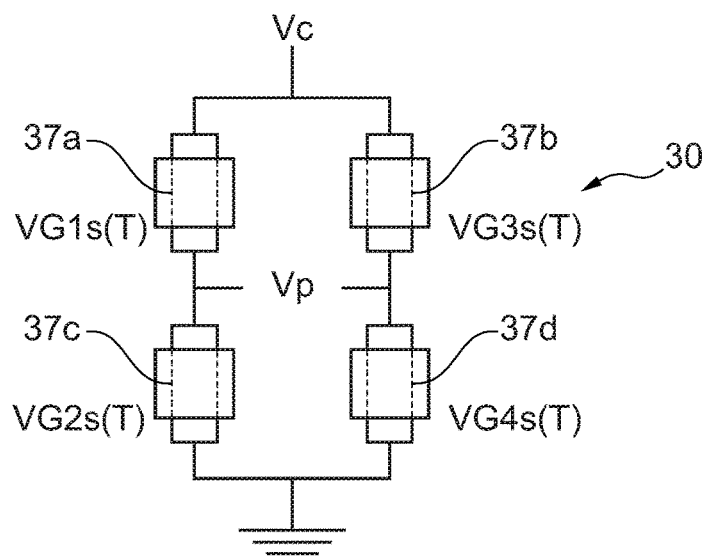

It is also possible to replace the resistors 33*a*-33*d* by the field effect transistors (FET) 37*a*-37*d*, as shown in FIG. 6D. These piezo-FETs 37*a*-37*d* are likewise produced in CMOS technology. The piezo-FETs 37*a*-37*d* have the advantage that their change in sensitivity upon temperature variations with a constant gate voltage is not very high. A further solution is illustrated in FIG. 6E, where the gate voltage of the piezo-FETs 37*a*-37*d* is controlled in temperature-dependent fashion. Each of the piezo-FETs 37*a*-37*d* can be adjusted individually by changing the relevant gate voltage.

Figure 6F:
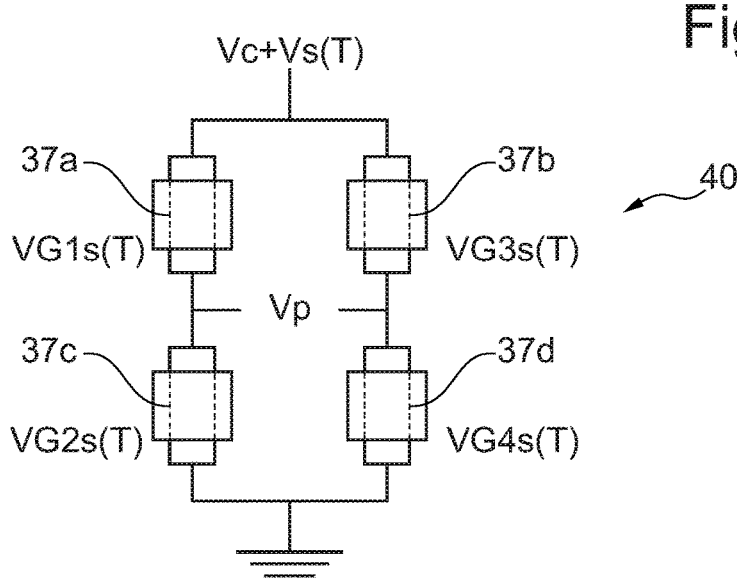

In a further exemplary embodiment, the supply voltage Vc is additionally complemented by a temperature-dependent voltage Vs (T), as shown in FIG. 6F.

Figure 6G:
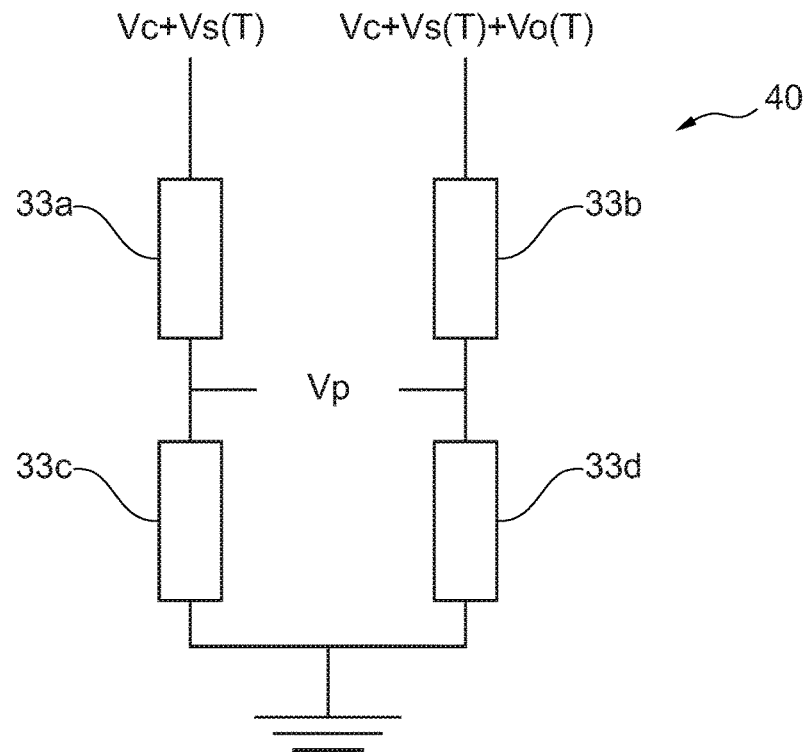

A further embodiment is illustrated in FIG. 6G, in which the supply voltage Vc is correspondingly extended by a first temperature-dependent supply voltage Vs (T) and a second temperature-dependent supply voltage Vo (T). In this exemplary embodiment the voltage in the two arms of the Wheatstone bridge 40 can be adjusted individually. By means of the supply voltage Vs (T), a temperature-dependent change in sensitivity of the Wheatstone bridge can be compensated, while the provisional voltage Vo (T) compensates a possible temperature-dependent offset of the bridge.

Figure 6H:
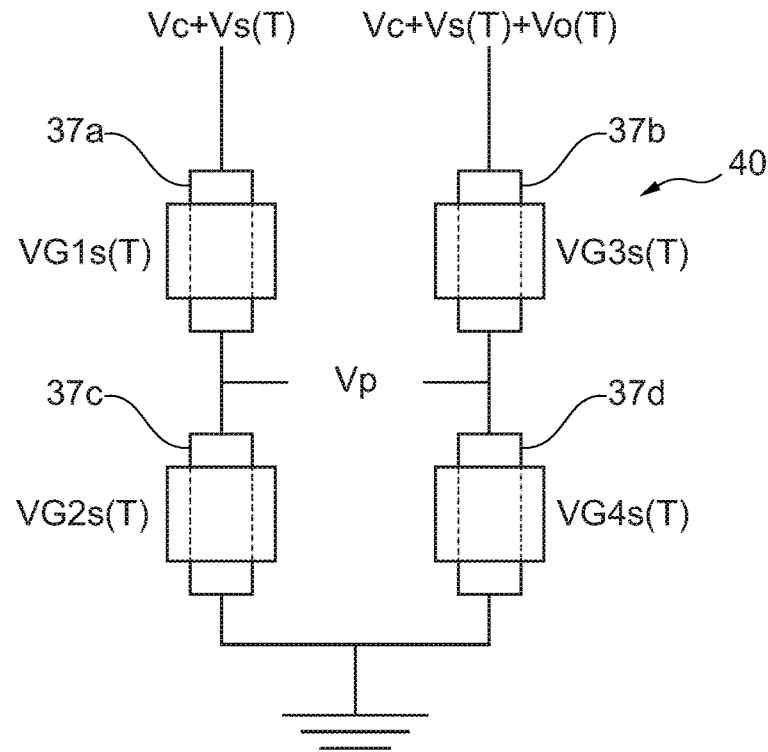

A further exemplary embodiment is shown in FIG. 6H, in which the supply voltages of the two conductor paths of the Wheatstone bridge are individually adjustable and the resistors 33*a*-33*d* are replaced by the temperature-controlled piezo-FETs 37*a*-37*d*.

Figure 2C:
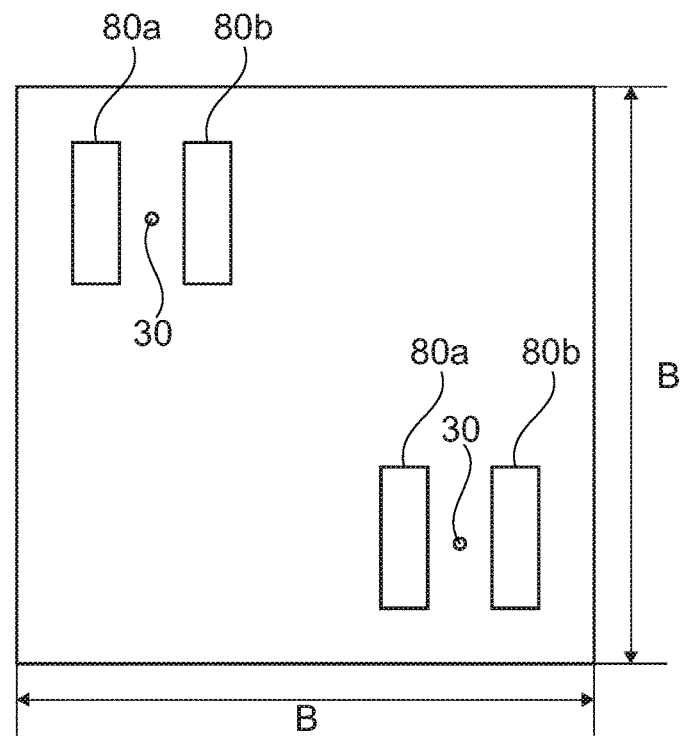
FIG. 2C shows an embodiment of the pressure sensor with two pairs of longitudinal grooves in the surface of the carrier chip.

The bias voltage circuit 40 of the FIGS. 6A-6H can also be used in a pressure sensor 10 which does not have longitudinal grooves 80*a*, 80*b*. In this case, the sensor element 30 is attached approximately in the center of the surface 20*u* of the carrier chip 20. In this aspect, the position of the sensor element 30 is not limiting and the sensor element 30 can also be attached in a different position of the carrier chip 20. In a further aspect, the carrier chip 20 can have two pairs of longitudinal grooves 80*a*, 80*b* with one or more sensor elements 30 on the surface 20*u*, as can be seen in FIG. 2C. This arrangement of the longitudinal grooves 80*a* and 80*b* permits the pressure sensor 10 to also function in the event of a mechanical or electrical damage of one of the sensor elements 30.

Figure 7:
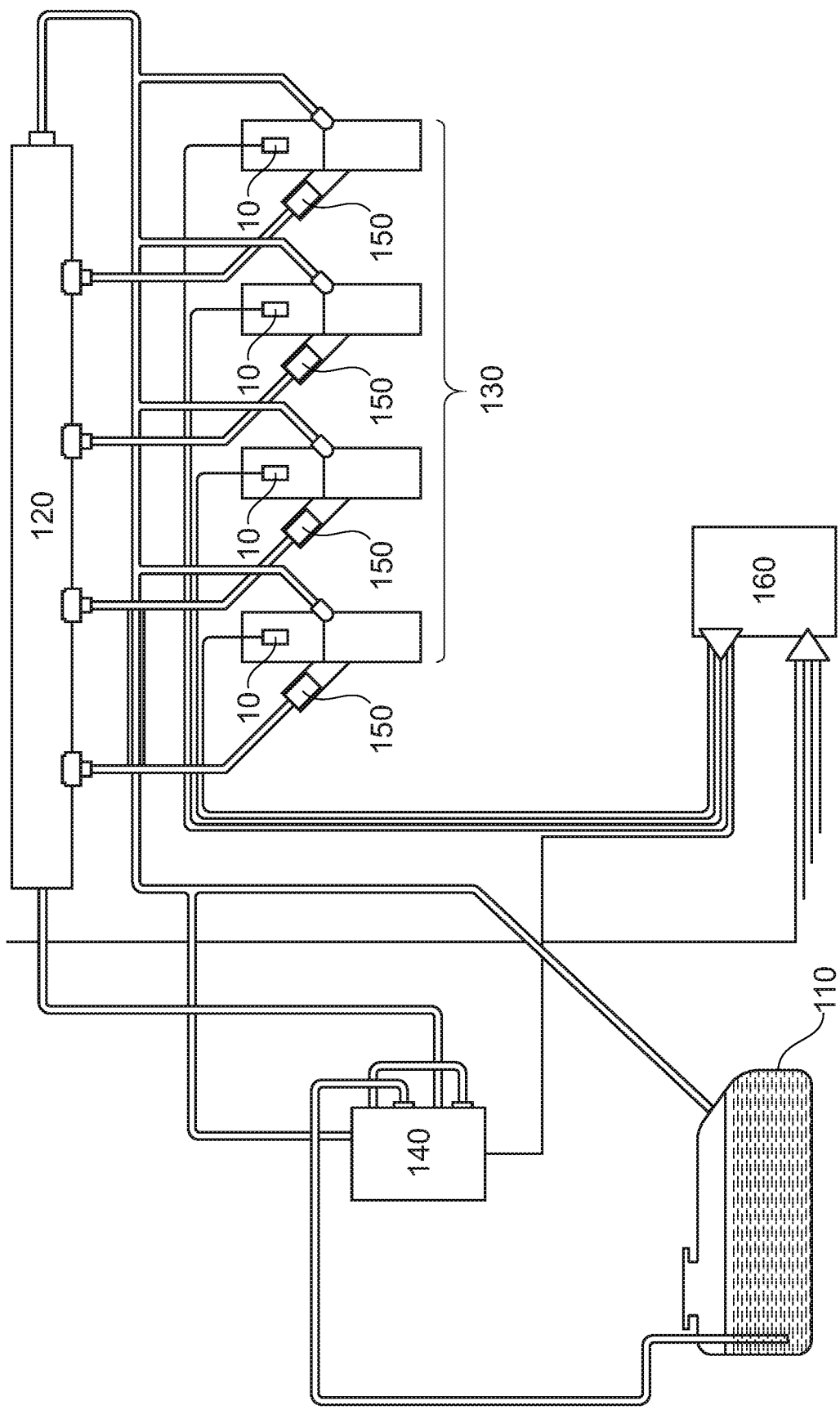
FIG. 7 shows a common rail injection system with the pressure sensor.

FIG. 7 shows an application of the pressure sensor 10 in a so-called common rail injection system as an injection system for a combustion engine. The common rail injection system has a fuel tank 100 connected to a multiplicity of injection nozzles 130 via a fuel distribution pipe 120. The injection nozzles 130 have valves 150 controlling the injection of the fuel in a corresponding cylinder 160. Each of the injection nozzles 130 has a pressure sensor 10 measuring the pressure in the cylinder 160 and thereby controlling the injected amount of fuel. A control unit 160 is connected to the corresponding pressure sensors 110 and valves 150 and can control the rate of inflow.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

LIST OF REFERENCE NUMBERS

10 pressure sensor
20 carrier chip
20*u* surface
20*l* back side
25 outer edge
30*a*, *b* sensor element
33*a*-*d* resistor
37*a*-*d* field effect transistors
40 bias voltage circuit
42 thermistor
50 solid body
50*l* back side of the solid body
80*a*, *b* longitudinal groove
90 wafer
90*u* front side
90*l* back side
92 platelet
94 etch mask
96 interruption
98 separating line
100 common rail injection system
110 fuel distribution pipe
130 injection nozzles
140 pump
150 valve
160 control valve

What is claimed is:
1. A pressure sensor comprising:
a solid body having a thickness D and a side length B, wherein the ratio D/B is larger than 0.5;

a carrier chip having a first surface facing and connected to the solid body, a second surface facing away from the solid body, and at least two independent and longitudinal grooves in said second surface, wherein the carrier chip has a layer thickness S between said first surface and said second surface and a side length B, which corresponds to the side length B of the solid body, wherein the ratio S/B is smaller than 0.1;

at least one sensor element arranged on the said second surface between the at least two independent and longitudinal grooves, wherein a length of the at least two independent and longitudinal grooves is at least as large as a lateral distance between the at least two independent and longitudinal grooves and a width of the at least two independent and longitudinal grooves is smaller than half of the lateral distance; and at least one bias voltage circuit connected to at least one of the at least one sensor element.

2. The pressure sensor according to claim 1, wherein said at least one sensor element comprises at least two sensor elements and two of the at least two sensor elements are arranged between the at least two independent and longitudinal grooves.

3. The pressure sensor according to claim 1, wherein the at least two independent and longitudinal grooves are arranged substantially parallel to each other.

4. The pressure sensor according to claim 1, wherein the at least one sensor element forms or contains a Wheatstone bridge.

5. The pressure sensor according to claim 1, wherein the carrier chip has a modulus of elasticity that differs from the modulus of elasticity of the solid body.

6. The pressure sensor according to claim 1, wherein at least one of the at least two independent and longitudinal grooves extends up to an outer edge of the carrier chip.

7. The pressure sensor according to claim 1, wherein the carrier chip has a thickness of less than 100 μm.

8. The pressure sensor according to claim 1, wherein the bias voltage circuit generates a temperature-dependent bias voltage.

9. The pressure sensor according to claim 1, wherein the bias voltage circuit has a thermistor with a negative temperature coefficient.

10. The pressure sensor according to claim 1, wherein the at least one sensor element is formed by or contains field effect transistors.

11. The pressure sensor according to claim 10, wherein gate electrodes of the field effect transistors are independently controllable.

12. The pressure sensor according to claim 1, wherein the bias voltage circuit is configured for two different supply voltages.

13. The pressure sensor according to claim 1, wherein the longitudinal extension directions of two of the grooves extend substantially parallel to each other.

14. A pressure sensor, comprising:

a solid body having a thickness D and a side length B, wherein the ratio D/B is larger than 0.5;

a carrier chip having a first surface facing and connected to the solid body, a second surface facing away from the solid body, and at least two independent and longitudinal grooves in said second surface, wherein the carrier chip has a layer thickness S between said first surface and said second surface and a side length B, which corresponds to the side length B of the solid body, wherein the ratio S/B is smaller than 0.1; and two sensor elements arranged between the at least two independent and longitudinal grooves, wherein a length of the at least two independent and longitudinal grooves is at least as large as a lateral distance between the at least two independent and longitudinal grooves and a width of the at least two independent and longitudinal grooves is smaller than half of the lateral distance.

* * * * *